United States Patent [19]

Masuda

[11] Patent Number: 5,403,413
[45] Date of Patent: Apr. 4, 1995

[54] APPARATUS AND METHOD FOR MANUFACTURING SURFACE FASTENER BANDS

[75] Inventor: Yuichi Masuda, Macon, Ga.

[73] Assignee: Yoshida Kogyo K.K., Tokyo, Japan

[21] Appl. No.: 130,629

[22] Filed: Oct. 1, 1993

[51] Int. Cl.⁶ .................. A44B 18/00; A41H 37/00
[52] U.S. Cl. .................... 156/66; 156/73.4; 156/73.1; 156/157; 156/250; 156/304.6; 156/304.7; 156/444; 156/502; 156/511; 156/543; 156/544; 156/580.1; 428/100; 24/442; 24/500
[58] Field of Search .................. 156/66, 73.1, 73.4, 156/250, 157, 304.6, 304.1, 304.7, 378, 444, 502, 511, 522, 538, 543, 544, 549, 556, 559, 580.1; 428/100; 24/450, 442; 2/DIG. 6

[56] References Cited

U.S. PATENT DOCUMENTS

| 3,086,529 | 4/1963 | Munz et al. ............... 428/100 X |
| 3,143,895 | 8/1964 | Robie ........................ 24/442 X |
| 3,426,363 | 2/1969 | Girard . |
| 3,491,800 | 1/1970 | Holton ....................... 24/450 X |
| 3,941,159 | 3/1976 | Toll .......................... 428/100 X |
| 4,249,689 | 2/1981 | Voytko ....................... 198/620 X |
| 4,791,236 | 12/1988 | Klein et al. .................. 428/100 X |
| 4,939,818 | 7/1990 | Hahn ......................... 24/442 X |
| 5,178,923 | 1/1993 | Andrieu et al. ............... 428/100 X |

*Primary Examiner*—Jeff H. Aftergut
*Attorney, Agent, or Firm*—Hill, Steadman & Simpson

[57] ABSTRACT

An apparatus and method for manufacturing surface fastener bands having opposite end portions provided with mating multiple fastener elements including a pair of grippers for moving the opposite end portions into a joining station for joining together to form a single band, and an endless belt conveyor having a continuous surface fastener tape applied on an upper surface thereof, and a pressing roller for pressing one of the end portions of the surface fastener band to the conveyor for transporting the band downstream to a packing station or further station.

10 Claims, 3 Drawing Sheets

APPARATUS AND METHOD FOR MANUFACTURING SURFACE FASTENER BANDS

BACKGROUND OF THE INVENTION

1. Field of the Invention

The present invention relates to an apparatus for manufacturing surface fastener bands allowing for adjustment of length and used for wrapping and binding. The invention is particularly adapted to binding a plurality of electrical cables or wires, or for compressively wrapping around a bleeding limb to prevent bleeding, and for like purposes.

2. Description of the Prior Art

A length-adjustable surface fastener band of the type described above is disclosed as in FIG. 8 of the U.S. Pat. No. 3,426,363. The disclosed fastener band comprises two fastener parts having their one end connected to each other; one being a hooked fastener part and the other a looped fastener part. The hooked fastener part comprises a base fabric and a multiplicity of hook-like fastener elements planted on one surface thereof. The looped fastener part comprises a base fabric and a multiplicity or loop-like fastener elements planted on one surface thereof. A connecting ring is joined to the other end of the loop fastener part.

For manufacturing such surface fastener bands, usually the matching edges of the hooked fastener parts and the looped fastener part are placed under an ultrasonic horn and then welded to each other under ultrasonic energy generated by the horn, this operation being all done manually.

However, such manual operation will lower production efficiency and can expose the worker to possible injury by an attachment means such as an ultrasonic horn, high-frequency welder, or other hot-melt adhesive.

Furthermore, utilizing full-automation, surface fastener bands are arranged to fall by gravity to be piled in sock cartons or boxes. However, surface fastener bands, since having hook-like or loop-like fastener elements; planted substantially over its entire surface, tend to engage with each other at random or accidentally. Once engaged with each other, the surface fastener bands must be forcibly separated. An entire batch can become entangled by accidental engagement of a plurality of the bands. The bands must then be separated and then packed neatly in cartons one by one for storing or shipment, which operation would be extremely tedious and time consuming.

SUMMARY OF THE INVENTION

With the foregoing difficulties in view, it is therefore an object of the present invention to provide an apparatus and method for manufacturing surface fastener bands which is very simple in construction and wherein, as surface fastener bands are manufactured, they are fed to a withdrawal station positively and smoothly without accidental engagement with each other during the feeding so that they can be packed easily and neatly at the withdrawal station.

According to the present invention, there is provided an apparatus for manufacturing surface fastener bands; each surface fastener band having a pair of mating fastener parts, one fastener part having a multiplicity of fastener elements on one surface and the other part having a multiplicity of fastener elements on one surface for surface-to-surface engagement with the first-mentioned fastener elements. The apparatus provides:

(a) a pair of grippers—movable toward and away from a joining station for intermittently transporting the two mating fastener parts to the joining station from the respective opposite sides and placing them at the joining station with the leading ends of the fastener parts overlapped to each other;

(b) joining means disposed at the joining station for joining the respective edges of the fastener parts to provide surface fastener bands;

(c) an endless belt conveyor mechanism provided at its upstream end beside the joining means, and disposed normal to the direction of the transportation of the two matching fastener parts, and circulating for feeding the surface fastener bands to a withdrawal station, the endless belt conveyor mechanism including an endless belt which has a continuous surface fastener tape of either the first-mentioned fastener elements or the second-mentioned fastener elements attached to the upper surface thereof; and (d) pressing means, such as a pressing roller, for pressing the surface fastener bands against the endless belt so as to bring either the first-mentioned fastener elements or the second-mentioned fastener elements of the surface fastener bands into engagement with the second-mentioned fastener elements or the first mentioned fastener elements of the endless belt.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE PREFERRED EMBODIMENT

Surface fastener bands 1 find various applications to many fields. A surface fastener band 1 can be used to bind a plurality of electrical cables together. And, it can be also used as a medical compression band which is firmly wrapped around a bleeding arm of a person to stop bleeding such as in an emergency situation, e.g., traffic accident.

Figure 6:
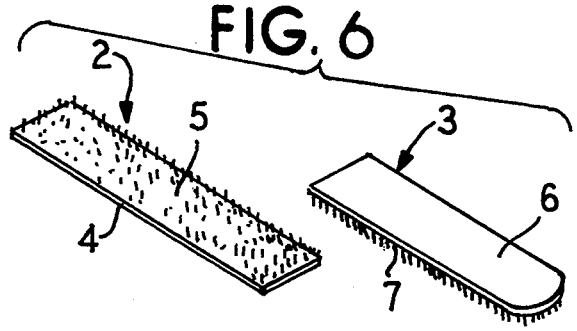
FIG. 6 is an exploded perspective view of the pair of companion tapes.
Figure 7:
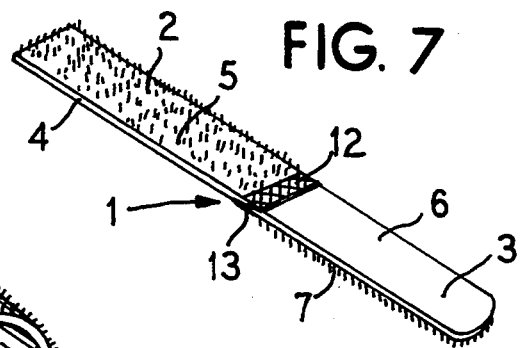
FIGS. 7 through 8 are perspective views of a surface fastener band assuming an open and closed posture.
Figure 9:
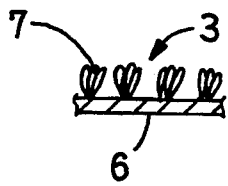
FIGS. 9 through 11 are the cross-sectional views of various surface fastener bands.
Figure 10:
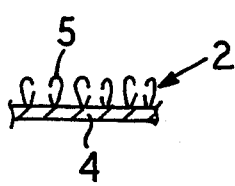
Figure 11:
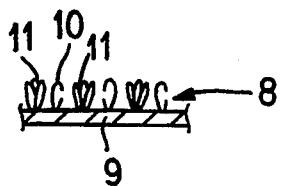

As shown in FIG. 7, the surface fastener band 1 is made by connecting two fastener halves 2, 3 at the respective ends 12, 13 such as by welding; one fastener half 2 being a hooked fastener and the other 3 a looped fastener, as shown in FIG. 6. The hooked fastener half 2 comprises a base fabric 4 and a multiplicity of hook-like fastener elements 5 planted or anchored thereof as shown in FIG. 10. The looped fastener half 3 comprises a base fabric 6 and a multiplicity of loop-like fastener elements 7 planted or anchored on one surface thereof as shown in FIG. 9. Alternatively, each fastener half 8 may be a mixed hook/loop fastener 8 comprising a base fabric 9 and a multiplicity of hook-like fastener elements 10 and a multiplicity of loop-like fastener 11 provided on one and the same surface thereof, as shown in FIG. 11.

As shown in FIG. 7, a pair of matching fastener halves 2, 3 are attached at their respective meeting edges 12, 13 to each other by welding them with the welding device, as closely described hereinafter, to provide the surface fastener band 1.

Figure 8:
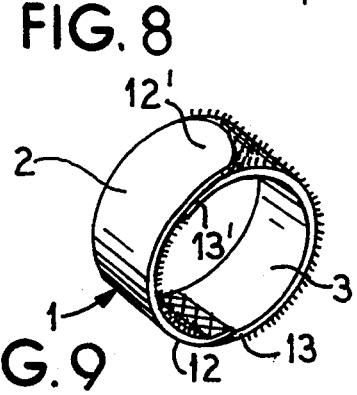

In use, the surface fastener band 1 is wrapped around something such as cables and has its both distal ends 12', 13' attached to each other by engaging the hook-like fastener elements 5 and the loop-like fastener elements 7 together, as shown in FIG. 8.

Figure 1:
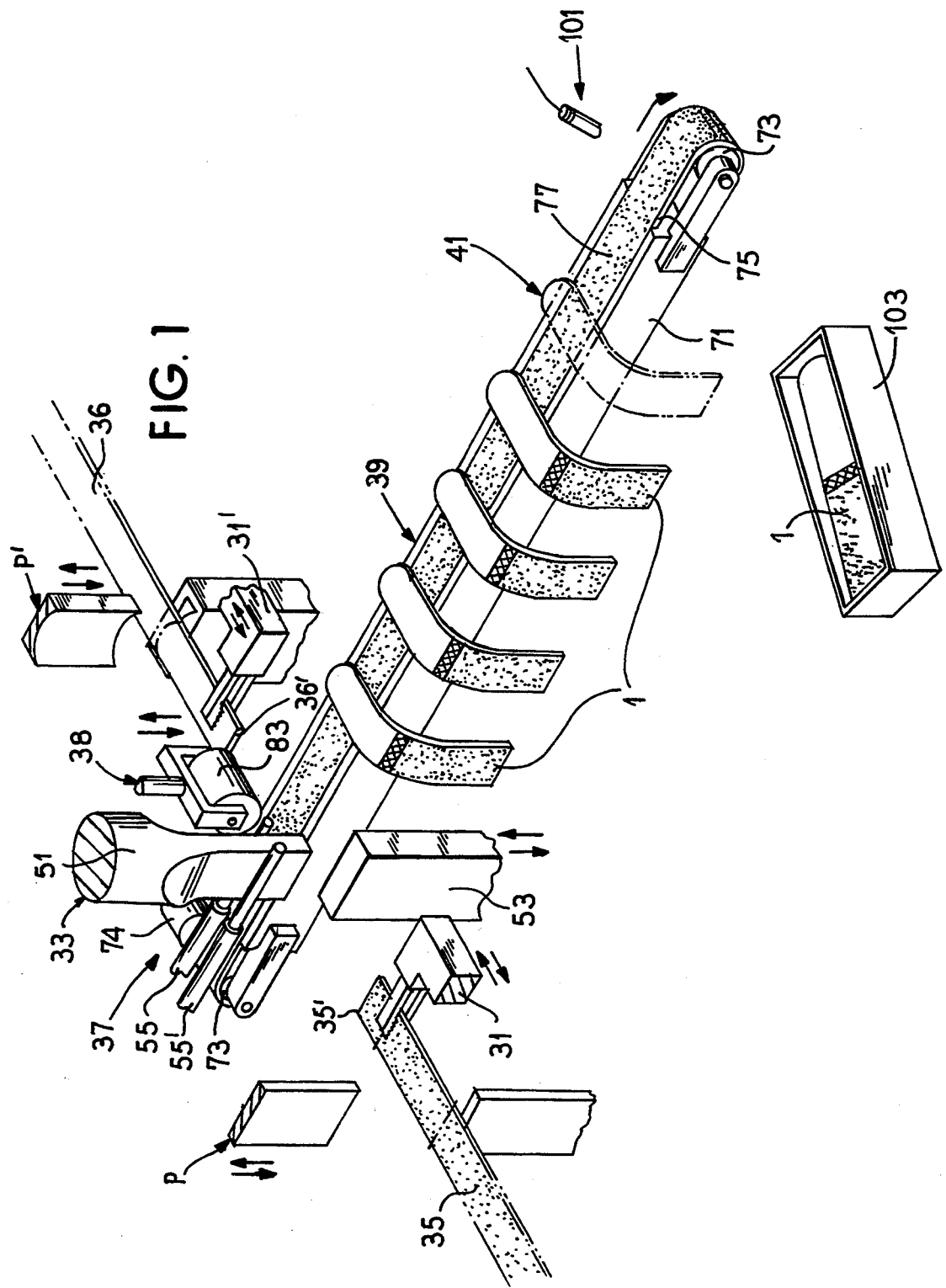
FIG. 1 is a diagrammatical perspective view of an apparatus for manufacturing surface fastener bands according to the present invention.

Referring now to FIG. 1, an apparatus for manufacturing surface fastener bands 1 according to the present invention broadly comprises: a pair of grippers 31, 31'; a joining means 33 for intermittently joining leading ends 35', 36' of a pair of continuous mating material tapes 35, 36 at a joining station 37 to provide a complete surface fastener band 1; an endless belt conveyor mechanism 39 for continuously feeding the complete surface fastener bands 1 to a withdrawal station 41; and pressing means 38 for pressing the fastener bands 1 against the endless belt conveyor mechanism 39 for surface-to-surface engagement of the fastener band 1 with an endless belt 75, as described hereinbelow.

As shown in FIG. 1, a pair of grippers 31, 31' are slidably mounted on respective gripper rails (not shown) for movable toward and away from the joining station 37 from opposite sides for intermittently transporting the two mating material fastener tapes 35, 36 to the joining station 37. As shown in FIG. 1, the left (as viewed in FIG. 1) gripper 31 grips the hook-like material tapes 35 while the right gripper 31' grips the loop-like material tapes 36. The grippers 31, 31' place the mating material tapes 35, 36 with their leading ends 35', 36' overlapped to each other, as better shown in FIG. 3.

The joining means 33 comprises an upper stationary ultrasonic horn 51 and a lower anvil 53 disposed in vertically opposed relation to each other. The stationary ultrasonic horn 51 has its lower operative end disposed slightly above the transportation path of the continuous material tapes 35, 36. The lower anvil 53 is vertically movable toward and away from the stationary ultrasonic horn 51 for intermittently welding the leading ends 35', 36' of the mating material tapes 35, 36 disposed therebetween.

As shown in FIGS. 1 through 4, a pair of compression air nozzles 55, 55' are mounted one on each side of the stationary ultrasonic horn 51. Each nozzle 55 is directed downward so as to jet compressed air downward.

As shown in FIG. 1, an endless belt conveyor mechanism 39 has its upstream end beside the joining station 37. The endless belt conveyor mechanism 39 is disposed normal to the transportation path of the mating material tapes 35, 36. The endless belt conveyor mechanism 39 comprises a belt frame 71, a plurality of rollers 73 (only end rollers are seen in FIG. 1) mounted in a line on the belt frame 71 and an endless belt 75 wrapped around the rollers 73. One of the rollers 73, such as the one shown near the joining station 37, is operatively connected to any suitable driving means such as an electrical motor 74 for rotating the endless belt 75 continually. An elongated hooked fastener tape 77 is attached to the entire upper surface of the endless belt 75 for the purpose described hereinbelow.

The pressing means 38 is disposed above the upstream end of the endless belt conveyor mechanism 39 and vertically movable toward and away from the upper side of the endless belt 75. The pressing means 38 comprises a vertically movable roller frame 81 and a presser roller 83 free-rotatably mounted on the frame 81 for pressing the surface fastener bands 1 against the upper surface of the hook-like surface fastener tape 77 wrapped around the endless belt 75.

A punch-and-die cutting device P, P' is provided upstream of each gripper 31, 31' for severing the continuous surface fastener material tapes 35, 36 into surface fastener halves 2, 3. Since the construction and operation of the punch-and-die cutting device P, P' is well known in this field, any further explanation is not necessary.

A withdrawal station 41 is provided in any position intermediate between the opposed ends of the endless belt conveyor mechanism 39. At the withdrawal station 41, a worker or a robot hand takes the complete surface fastener bands 1 out of engagement with the endless surface fastener tape 77.

In addition, detecting means 101 such as a photodiode and a light-emitting diode is disposed slightly upstream of the downstream end of the endless belt conveyor mechanism 39. The detecting means 101 is designed for detecting whether any surface fastener band 1 remains engaged on the endless surface fastener tape 77 by mistake. If it detects a surface fastener band 1 remaining on the endless fastener tape 77, then the detecting mans transmit a signal to deenergize the whole apparatus, thereby preventing trouble in the withdrawing operation of complete surface fastener bands 1.

Figure 2:
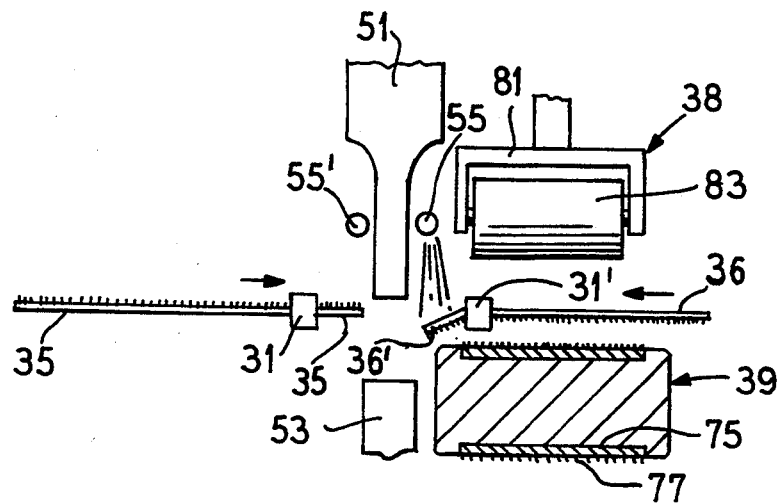
FIGS. 2 through 5 are side views of a welding station showing consecutive steps for welding leading ends of a pair of continuous companion tapes.

In operation, the continuous mating surface fastener tapes 35, 36 are transported to the joining station 37 from the opposed side by the grippers 31, 31' along the path of transportation. Slightly before the leading ends 35', 36' of the mating material surface tapes 35, 36 reach the joining station 37, as shown in FIG. 2, the right (as viewed in FIG. 2) nozzle 55 jets compressed air downward so as to deflect the leading end 36' of the right material surface tape 36 downward.

Figure 3:
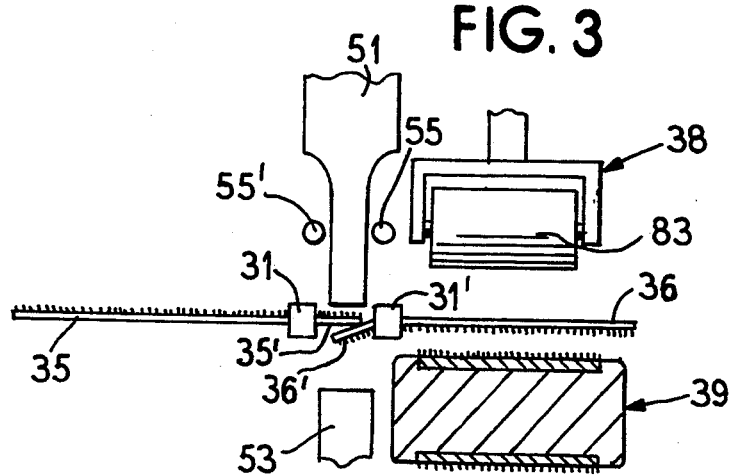

The mating continuous surface fastener tapes 35, 36 advance toward each other to the joining station 37 with the leading end 36' of the right tape 36 remaining deflected beneath the leading end 35' of the left tape 35 until the respective leading ends 35', 36' of the continuous material tapes 35, 36 are overlapped with each other, as shown in FIG. 3.

Figure 4:
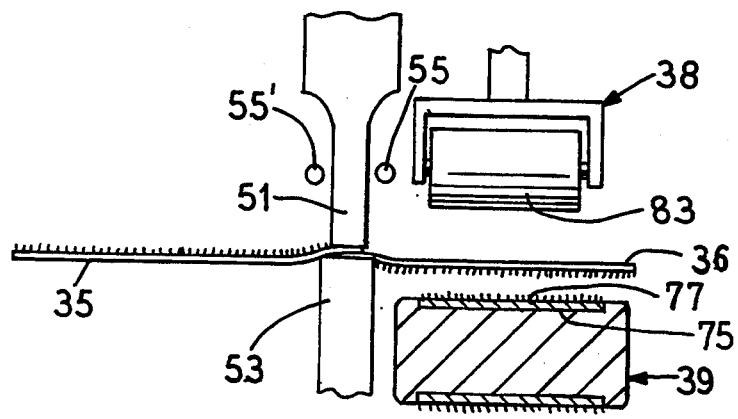

At this instant, as shown in FIG. 4, the lower movable anvil 53 ascends to lift the thus overlapped leading ends 35', 36' of the continuous material tapes 35, 36 against the ultrasonic horn 51 so that the continuous material tapes 35, 36 are welded along their overlapped ends 35', 36' under ultrasonic energy. At the same time, the continuous material tapes 35, 36 are severed on the opposed sides of the joining station 37 by the punch-and-die cutting devices P, P' to thus provide a complete surface fastener tape band 1 shown in FIG. 7. As the foregoing cycle is repeated, a succession of surface fastener tape bands 1 can be produced.

Figure 5:
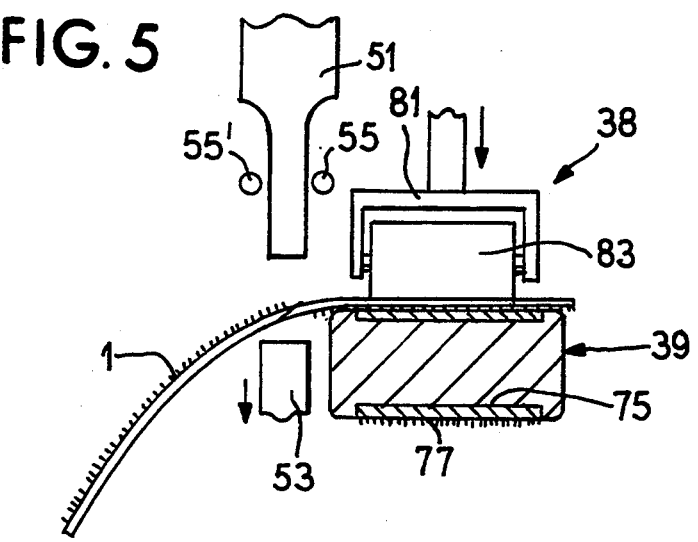

As shown in FIG. 5, the movable anvil 53 descends and at the same time the presser roller 83 also descends to depress the thus produced surface fastener band 1 against the upper surface of the continuous hook-like surface fastener tape 77 wrapped around the endless belt 75 so that the surface fastener tape bands 1 are tentatively attached to the endless belt 75 in a succession, as better shown in FIG. 1. As the surface fastener tape bands 1 are produced at the joining station, they are fed by the endless belt conveyer mechanism 39 to the withdrawal station 41.

When the surface fastener tape bands 1 reach the withdrawal station 41, either a worker or a robot hand takes them from the continuous surface fastener tape 77 and packs them into a box 103. Alternatively, the surface fastener tape band 1 may go to a subsequent step in which a connecting ring (not shown) is to be attached to either end of the surface fastener tape band 1.

The driving speed of the endless belt conveyer mechanism 39 may be suitably adjusted in timed relation with the operation speed of the joining station and the operation speed of the withdrawal station.

It is to be noted that which type of continuous surface fastener tape 77 must be wrapped around the endless belt 75, a hook-like one or a loop-like one, depends on which type of surface fastener band 1 the endless belt 75 engage. If the surface fastener bands 1 are hook-like ones, then loop-like continuous surface fastener tape 77 must be wrapped around the endless belt 75, and vice and versa. So, if a continuous surface fastener tape 77 of the mixed hook/loop surface fastener as shown in FIG. 11 is wrapped around the belt 75, this tape 77 is advantageously applicable to both hook-like and loop-like surface fastener bands 1.

With the construction as set forth hereinabove, as surface fastener bands are manufactured, they are fed to withdrawal station positively and smoothly without unnecessary engagement with each other during the feeding so that they are packed easily and neatly at the withdrawal station.

Although the present invention has been described with reference to a specific embodiment, those of skill in the art will recognize that changes may be made thereto without departing from the scope and spirit of the invention as set forth in the appended claims.

I claim as my invention:

1. A method for manufacturing surface fastener bands, each surface fastener band having a pair of mating fastener parts, one fastener part having a multiplicity of fastener elements on one surface and the other fastener part having a multiplicity of fastener elements on one surface for surface-to-surface engagement with the first mentioned fastener elements, comprising the steps of:

arranging the first fastener part and said second fastener part in respective streams approaching a joining station, and intermittently transporting two mating fastener parts to the joining station from respective opposite sides of the joining station;

mating leading end portions of the mating fastener parts to each other;

joining the leading end portions of the fastener parts to provide a single surface fastener band at a joining station and severing the joined fastener parts from their respective streams;

arranging a conveyor mechanism adjacent said joining station beneath a surface of one of said fastener parts, and providing on an upward facing surface of said conveyor mechanism a continuous surface fastener tape compatible for engagement with said one surface fastener part;

pressing said surface fastener part downward onto said conveyor mechanism;

circulating said conveyor mechanism to translate said surface fastener band away from said joining station.

2. An apparatus for manufacturing and transporting a surface fastener assembly, the surface fastener assembly having a fastener part having a multiplicity of fastener elements on one surface, and a second part to be fixed to said fastener part, comprising:

means for moving the fastener part and the second part toward and away from a joining station for intermittently transporting in a direction the fastener part and the second part to the joining station from the respective opposite sides and placing the fastener part and the second part at the joining station with leading end portions of the fastener part and the second part adjacent each other;

joining means disposed at the joining station for joining the leading end portions of the fastener part and the second part to provide a surface fastener assembly;

an endless belt conveyor mechanism having an upstream and disposed beside the joining means, the endless belt conveyor mechanism disposed normal to the direction of the transportation of the fastener part and second part and rotatably movable for feeding the surface fastener assembly to a withdrawal station, the endless belt conveyor mechanism including an endless belt which has a continuous surface fastener tape facing upwardly suitable for mating with the fastener part arranged thereabove; and pressing means for pressing the fastener part against the endless belt so as to bring the multiplicity of fastener elements into engagement with the continuous surface fastener tape.

3. An apparatus according to claim 2, wherein said second part comprises a second fastener part having a multiplicity of fastener elements compatible for engagement with said first fastener part.

4. An apparatus according to claim 3, wherein said means for intermittently transporting comprises a pair of grippers movable toward and away from the joining station.

5. An apparatus according to claim 2, wherein said pressing means comprises a roller rotatably mounted within a roller bracket, said roller bracket descendible to press said roller onto said fastener part.

6. An apparatus according to claim 2 further comprising an air nozzle means arranged adjacent said joining means for forcing air against said fastener part for depressing the leading end portion of said fastener part below said second part for overlapping said fastener part and said second part.

7. An apparatus for manufacturing surface fastener bands, each surface fastener band having a pair of mating fastener parts, one fastener part having a multiplicity of fastener elements on one surface and the other part having a multiplicity of fastener elements on one surface for surface-to-surface engagement with the first-mentioned fastener elements, comprising:

a pair of grippers movable toward and away from a joining station for intermittently transporting in a direction two mating fastener parts to the joining station from respective opposite sides and placing the mating fastener parts at the joining station with leading end portions of the fastener parts overlapped to each other;

joining means disposed at the joining station for joining the leading end portions of the fastener parts to provide surface fastener bands;

an endless belt conveyor mechanism having upstream end disposed beside the joining means, the mechanism disposed normal to the direction of the transportation of the two mating fastener parts and rotatably movable for feeding the surface fastener bands to a withdrawal station, the endless belt conveyor mechanism including an endless belt which has a continuous surface fastener tape facing upwardly suitable for mating with a respective one of the fastener parts arranged thereabove; and pressing means for pressing the surface fastener bands against the endless belt so as to bring the respective one fastener part into engagement with the continuous surface fastener tape.

8. An apparatus according to claim 1 further comprising a compressed-air nozzle mounted on a side of the joining means, said nozzle configured to blow air onto one of said mating fastener parts.

9. An apparatus according to claim 1 further comprising detecting means disposed adjacent a downstream end of the endless belt conveyor mechanism for detecting whether a surface fastener band remains attached to the endless belt.

10. An apparatus according to claim 1, wherein the joining means comprises a stationary ultrasonic horn and a movable anvil disposed in vertically opposed relation to each other, the anvil being movable toward and away from the stationary ultrasonic horn to weld the respective edges of the fastener parts therebetween.

* * * * *